United States Patent
Palos et al.

(10) Patent No.: US 11,263,819 B2
(45) Date of Patent: Mar. 1, 2022

(54) INTERACTION BETWEEN A VIEWER AND AN OBJECT IN AN AUGMENTED REALITY ENVIRONMENT

(71) Applicant: GOOGLE LLC, Mountain View, CA (US)

(72) Inventors: Xavier Benavides Palos, San Francisco, CA (US); Brett Barros, Millbrae, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/946,453

(22) Filed: Jun. 23, 2020

(65) Prior Publication Data

US 2020/0320798 A1    Oct. 8, 2020

Related U.S. Application Data

(62) Division of application No. 15/820,813, filed on Nov. 22, 2017, now Pat. No. 10,726,626.

(51) Int. Cl.
*G06T 19/00* (2011.01)
*G06T 15/80* (2011.01)
(Continued)

(52) U.S. Cl.
CPC ............ *G06T 19/006* (2013.01); *G06T 15/04* (2013.01); *G06T 15/10* (2013.01); *G06T 15/50* (2013.01);
(Continued)

(58) Field of Classification Search
CPC ..... G06T 19/003; G06T 19/006; G06T 19/20; G06T 15/04; G06T 15/10; G06T 15/50; G06T 15/80; G06T 17/205
See application file for complete search history.

(56) References Cited

U.S. PATENT DOCUMENTS 6,507,341 B1    1/2003   Gross et al.
8,643,569 B2    2/2014   Vesely
(Continued)

FOREIGN PATENT DOCUMENTS

JP    2004341572 A   *  12/2004

OTHER PUBLICATIONS

Anonymous ("Toolforger"): "Rendering an object from the inside", jMonkeyEngine Hub, Feb. 1, 2013, pp. 1-5, XP055559071, Retrieved from: https://hub.jmonkeyengine.org/t/rendering-an-object-from-the-inside/25355 [retrieved on Feb. 19, 2019].

(Continued)

*Primary Examiner* — Chante E Harrison
(74) *Attorney, Agent, or Firm* — Brake Hughes Bellermann LLP

(57) ABSTRACT

A method includes: triggering rendering of an augmented reality (AR) environment having a viewer configured for generating views of the AR environment; triggering rendering, in the AR environment, of an object with an outside surface visualized using a mesh having a direction oriented away from the object; performing a first determination that the viewer is inside the object as a result of relative movement between the viewer and the object; and in response to the first determination, increasing a transparency of the outside surface, reversing the direction of at least part of the mesh, and triggering rendering of an inside surface of the object using the part of the mesh having the reversed direction, wherein the inside surface is illuminated by light from outside the object due to the increased transparency.

20 Claims, 13 Drawing Sheets

(51) Int. Cl.
*G06T 19/20* (2011.01)
*G06T 15/10* (2011.01)
*G06T 15/50* (2011.01)
*G06T 17/20* (2006.01)
*G06T 15/04* (2011.01)

(52) U.S. Cl.
CPC ............ *G06T 15/80* (2013.01); *G06T 17/205* (2013.01); *G06T 19/003* (2013.01); *G06T 19/20* (2013.01)

(56) References Cited

U.S. PATENT DOCUMENTS

| | | | |
|---|---|---|---|
| 9,248,000 | B2 | 2/2016 | Sarvestani et al. |
| 9,786,097 | B2 | 10/2017 | Bell et al. |
| 10,362,299 | B1* | 7/2019 | Niemeyer ............... G06F 3/012 |
| 10,675,766 | B1* | 6/2020 | Niemeyer ............... G06F 3/011 |
| 10,712,899 | B2* | 7/2020 | McBeth ............ G02B 27/0093 |
| 2002/0163516 | A1 | 11/2002 | Hubbell |
| 2003/0142102 | A1 | 7/2003 | Emberling et al. |
| 2007/0038421 | A1 | 2/2007 | Hu et al. |
| 2008/0062197 | A1 | 3/2008 | Bi et al. |
| 2008/0120561 | A1 | 5/2008 | Woods |
| 2009/0322671 | A1 | 12/2009 | Scott et al. |
| 2012/0092342 | A1 | 4/2012 | Suzuki et al. |
| 2013/0321461 | A1 | 12/2013 | Filip |
| 2014/0002491 | A1 | 1/2014 | Lamb et al. |
| 2014/0361976 | A1 | 12/2014 | Mao et al. |
| 2014/0368504 | A1 | 12/2014 | Chen et al. |
| 2017/0053447 | A1 | 2/2017 | Chen et al. |
| 2017/0084079 | A1 | 3/2017 | Hamada et al. |
| 2017/0169616 | A1* | 6/2017 | Wiley ..................... G06F 3/017 |
| 2017/0186219 | A1 | 6/2017 | Xu |
| 2018/0018826 | A1 | 1/2018 | Maier et al. |
| 2018/0101223 | A1* | 4/2018 | Ishihara .................. G06F 3/147 |
| 2018/0122043 | A1* | 5/2018 | Energin ................ A63F 13/428 |
| 2018/0122142 | A1 | 5/2018 | Egeler et al. |
| 2018/0205926 | A1 | 7/2018 | Mogalapalli et al. |
| 2018/0256258 | A1 | 9/2018 | Nash et al. |
| 2019/0035124 | A1* | 1/2019 | Kapinos .................. G06T 11/60 |
| 2019/0088002 | A1 | 3/2019 | Howson et al. |
| 2019/0156550 | A1 | 5/2019 | Stanard |
| 2020/0013227 | A1* | 1/2020 | Lyren ................... G02B 27/017 |
| 2020/0250874 | A1* | 8/2020 | Assouline ............. G06N 5/022 |
| 2020/0294265 | A1* | 9/2020 | Kimura .................. G06T 19/00 |
| 2021/0014468 | A1* | 1/2021 | Takahashi ............ H04N 13/117 |

OTHER PUBLICATIONS

Dave Shreiner: "OpenGL Programming Guide—Chapter 5: Lighting", In: "OpenGL Programming Guide: The Official Guide to Learning OpenGL", Jul. 31, 2009, XP055212439.

International Search Report and Written Opinion for International Application No. PCT/US2018/061816, dated May 2, 2019, 19 pages.

"Ambient Lighting", Unity 3D (https://unity3d.com/learn/tutorials/topics/graphics/ambient-lighting?playlist-17102), printed, Nov. 9, 2017, 9 pages.

"Implementing two-sided shading", PackPub Open GL (https://www.packtpub.com/mapt/book/application_development/9781788296724/10/ch02lvl1sec025/implementing-two-sided-shading), printed, Oct. 10, 2017, 7 pages.

"Light Types", Unity 3D (https://unity3d.com/learn/tutorials/topics/graphics/light-types?playlist-17102), printed, Nov. 9, 2017, 9 pages.

Breen, David E., et al., "Interactive Occlusion and Collision of Real and Virtual Objects in Augmented Reality", Technical report ECRC-95-02, European Computer-Industry Research Centre, 1995, 22 pages.

Reitmayr, Gerhard, et al., "Collaborative Augmented Reality for Outdoor Navigation and Information Browsing", Conference Paper, Interactive Media Systems Group, Vienna University of Technology, Jan. 2004, 11 pages.

U.S. Appl. No. 15/820,813, filed Nov. 22, 2017, Allowed.

* cited by examiner

INTERACTION BETWEEN A VIEWER AND AN OBJECT IN AN AUGMENTED REALITY ENVIRONMENT

CROSS-REFERENCE TO RELATED APPLICATION

This application is a divisional of, and claims priority to, U.S. application Ser. No. 15/820,813, filed on Nov. 22, 2017, and entitled "INTERACTION BETWEEN A VIEWER AND AN OBJECT IN AN AUGMENTED REALITY ENVIRONMENT", the disclosure of which is incorporated by reference herein in its entirety.

TECHNICAL FIELD

This document relates, generally, to interaction between a viewer and an object in an augmented reality environment.

BACKGROUND

Some systems that provide augmented reality (AR) environments do so by generating a view that includes both an image of a physical environment (e.g., captured using a video camera function on a device) and one or more objects or other AR features that are added to the image of the physical environment. Observing such an AR environment can give the user the realistic impression of being in and/or traveling through a world that is a mixture of physical and AR objects. The interaction between the user and these objects can be an important aspect of the user's experience of the AR environment.

SUMMARY

In a first aspect, a method includes: triggering rendering of an augmented reality (AR) environment having a viewer configured for generating views of the AR environment; triggering rendering, in the AR environment, of an object with an outside surface visualized using a mesh having a direction oriented away from the object; performing a first determination that the viewer is inside the object as a result of relative movement between the viewer and the object; and in response to the first determination, increasing a transparency of the outside surface, reversing the direction of at least part of the mesh, and triggering rendering of an inside surface of the object using the part of the mesh having the reversed direction, wherein the inside surface is illuminated by light from outside the object due to the increased transparency.

Implementations can include any or all of the following features. The direction can be defined by a normal vector of the mesh, and reversing the direction of at least part of the mesh can include inverting the normal vector for the part of the mesh. The first determination can include determining that the viewer clips the outside surface of the object. A material can be defined for the object, the material can be applied to the mesh, and the method can further include, in response to the first determination, applying a shader and texture to the material. The shader can be a Fresnel shader. The shader can be at least one of a glass shader or a water shader. A material can be defined for the object, the material can be applied to the mesh, and the method can further include, in response to the first determination, applying a translucency to the material. A material can be defined for the object, the material can be applied to the mesh, and the method can further include, in response to the first determination, altering a property of the material. The property can include at least one of a reflectiveness, a refraction, or a diffraction of the material. The method can further include: performing a second determination, after rendering the inside surface, that the viewer is outside the object as a result of the movement; and in response to the second determination, restoring the transparency of the outside surface, and reverting the direction of the part of the mesh so the mesh is rendered outside of the object.

In a second aspect, a non-transitory storage medium can have stored thereon instructions that when executed are configured to cause a processor to perform operations. The operations can include: rendering an augmented reality (AR) environment having a viewer configured for movement to locations in the AR environment and for generating views of the AR environment from the locations; rendering, in the AR environment, an object with an outside surface visualized using a mesh having a direction defined, wherein the direction is away from the object; performing a first determination that the viewer is inside the object as a result of the movement; and in response to the first determination, increasing a transparency of the outside surface, reversing the direction of at least part of the mesh, and rendering an inside surface of the object using the part of the mesh having the reversed direction, wherein the inside surface is illuminated by the light source due to the increased transparency.

In a third aspect, a method includes: triggering rendering of an augmented reality (AR) environment having a viewer configured for generating views of the AR environment; triggering rendering of an object at a position in the AR environment; performing a first determination that the viewer and the object contact each other as a result of relative movement between the viewer and the object; in response to the first determination, repositioning the object in the AR environment based on continued relative movement between the viewer and the object; performing a second determination that the repositioning of the object based on the continued relative movement reaches a threshold; and in response to the second determination, relocating the object without affecting the continued relative movement.

Implementations can include any or all of the following features. The threshold can be defined based on a length of the object in a direction of a continued movement of the viewer. The repositioning can include performing a linear translation of the object according to the continued movement. The method can further include positioning, in response to the first determination, a fulcrum in the AR environment, and defining a pivot arm from the object to the fulcrum, wherein the repositioning of the object comprises rotating the object and the pivot arm about the fulcrum. The fulcrum can be defined above the object in the AR environment. The fulcrum can be defined below the object in the AR environment. The positioning of the fulcrum and definition of the arm can be performed according to a generalized behavior defined for all properties in the AR environment. The method can further include applying an effect to the object in response to the first determination, and removing the effect in response to the second determination. Applying the effect can include altering a transparency of the object, and removing the effect can include restoring the transparency of the object.

In a fourth aspect, a non-transitory storage medium has stored thereon instructions that when executed are configured to cause a processor to perform operations. The operations include: triggering rendering of an augmented reality (AR) environment having a viewer configured for generating views of the AR environment; triggering rendering of an object at a position in the AR environment; performing a first determination that the viewer and the object contact each other as a result of relative movement between the viewer and the object; in response to the first determination, repositioning the object in the AR environment based on continued relative movement between the viewer and the object; performing a second determination that the repositioning of the object based on the continued relative movement reaches a threshold; and in response to the second determination, relocating the object without affecting the continued relative movement.

BRIEF DESCRIPTION OF DRAWINGS

Like reference symbols in the various drawings indicate like elements.

DETAILED DESCRIPTION

Figure 1A:
FIGS. 1A-B show an example of rendering an inside of an AR object.

This document describes examples of interactions between a viewer and one or more augmented reality (AR) objects in an AR environment. Such interactions can occur in response to the viewer moving into contact with the AR object. In some implementations, the interaction can involve allowing the viewer to enter inside the AR object so as to render a view of the inside of the object. For example, an effect can be applied to give the impression that the viewer is inside an object made of a material such as glass or water. In some implementations, the interaction between the viewer and the AR object can involve the viewer temporarily displacing the AR object from its current position to a threshold displacement, and thereafter relocate the AR object. For example, the displacement can include a linear translation of the AR object, or to treat the AR object as if suspended from a fulcrum so as to rotate the AR object about the fulcrum. Some implementations can also or instead be applied in a virtual-reality system, for example to provide an immersive virtual-reality experience.

Some existing systems allow the user to enter "inside" the AR object, but the inside does not have a defined texture or appearance. As such, the application that generates the AR environment may essentially stop rendering while the user is inside the AR object. The view may become entirely black to the user, which may provide a lesser experience.

Some systems that have provided virtual reality-type experiences have embellished the computer-defined object with further definitions of the object's interior. For example, beneath the outer surface of the object there can be defined an additional layer that becomes visible when the camera "clips" the object's outer surface. However, this approach may require significant additional work in defining the interior features, and it may not provide the user a plausible experience of being inside the object.

Implementations of the present disclosure can provide advancements and improvements in the field of computer-related technology. One drawback of existing AR systems may be that they provide interactions between the user and AR objects that are not realistic or not plausible. For example, implementations can give the user who is moving inside an AR environment a realistic impression of venturing inside an AR object and thereafter moving out of the object again. In some implementations, this can be done without embellishing the model of the AR object with any more layers or other definitions of visual content, and/or without the need to create any extra light sources to ensure illumination of the inside of the AR object. Transparency and/or other effects can be applied which helps reduce or eliminate any cognitive disconnect between the moment when the user is viewing the AR object from the outside and when the user is inside the AR object. Some implementations can allow the user to see an ambient or surrounding environment while being inside the AR object. When the user who travels inside the AR object does not lose sight of the outer environment of the AR object in the AR environment, this can serve to make the experience feel more logical and believable for the user.

Figure 1B:
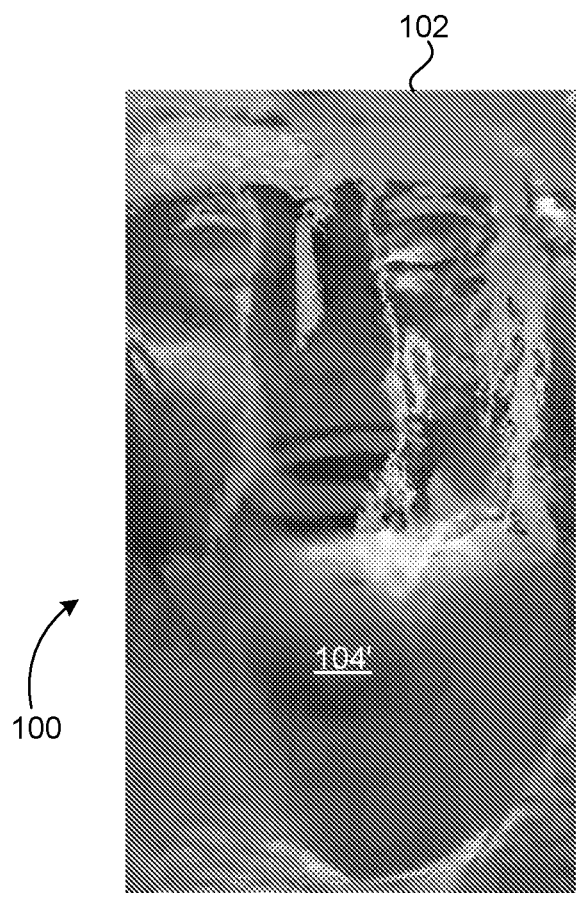

FIGS. 1A-B show an example of rendering an inside (e.g., interior) of an AR object 100. The AR object 100 can be, or be part of, any other AR object described herein, such as in FIG. 2A-B, 3, 4A-C or 5A-C. In FIG. 1A, the AR object 100 is viewed inside a frame 102 which signifies that the user is observing an AR environment that is generated by a computer, for example any of the devices described below with reference to FIG. 11. The AR object 100 is here a statue of a person or deity, only part of which is currently visible. Part of the head and shoulders of the AR object 100 are here viewed from an angle. The view is generated by way of a viewer in the AR environment, which defines the viewpoint from which the resulting image is generated. Here, the AR object 100 is visualized using an outside surface 104 which when rendered according to the position of the viewer gives the AR object 100 is current appearance. For example, the outside surface 104 has one or more textures defined which define the outcome of the rendering.

Assume now that the viewer is being moved relative to the AR object 100. For example, the AR environment is defined with regard to the room where the user is, and the AR object is generated to be visible at a particular position in relation to that room. The user can manipulate an input function—such as by physically moving a handheld device which is capturing the physical environment or by activating an input control—to change the user's position in the AR environment. For example, the user is here manipulating the AR environment to move towards the AR object 100 and ultimately to move inside the AR object 100.

FIG. 1B shows an example of the AR environment when the user has moved the viewer to be positioned inside the AR object 100. The AR object 100 is viewed inside the frame 102 and is now viewed such that the user sees directly onto the face of the AR object 100 from its inside. The features of the AR object 100 that are visible (e.g., eyes, nose, mouth) are generated by way of an inside surface 104' of the AR object 100. For example, the inside surface 104' is visualized by rendering of a texture that has been determined using the texture of the outside surface 104 (FIG. 1A).

A transparency of the outside surface 104 (FIG. 1A) can be increased as part of the interaction. For example, the outside surface 104 may initially be non-transparent, and in response to the viewer crossing (e.g., clipping) the boundary between the outside and inside surfaces of the AR object 200, the transparency can be increased so that the AR object 100 becomes at least partially transparent.

One or more filters or other effects can be added to the inside surface 104'. For example, and without limitation, the inside surface 104' can be provided with a "glass" effect that gives the user the impression of being inside a statue made of glass. For example, and without limitation, the inside surface 104' can be provided with a "glass" effect that gives the user the impression of being inside a statue made of glass. As another example, and without limitation, the inside surface 104' can be provided with a "water" effect that gives the user the impression of being inside a statue made of water. As such, in the situation of FIG. 1B the user may now be seeing the ambient surrounding of the AR object 100 through a semitransparent filter that resembles the outer surface of the AR object 100. This can provide a plausible impression of having traveled into the inside of the AR object 100 and can give a realistic experience of looing out at the remainder of the AR environment through the (semi-) transparent surface of such an object.

Figure 2A:
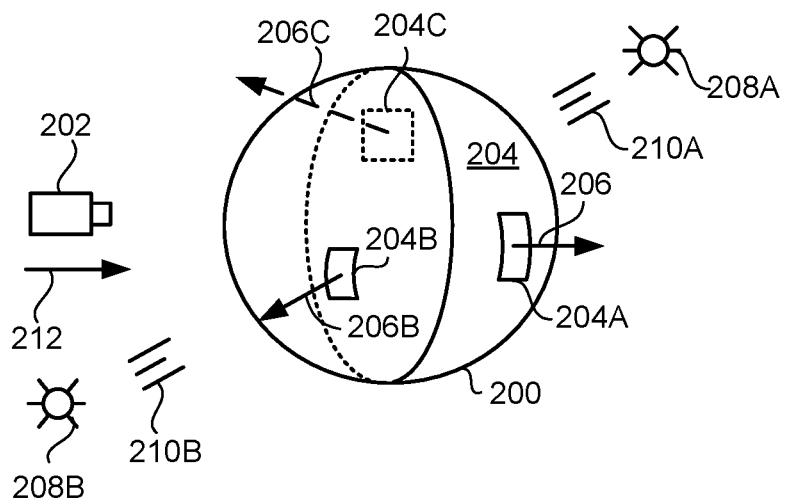
FIGS. 2A-B show an example of rendering an inside of an AR object.
Figure 2B:
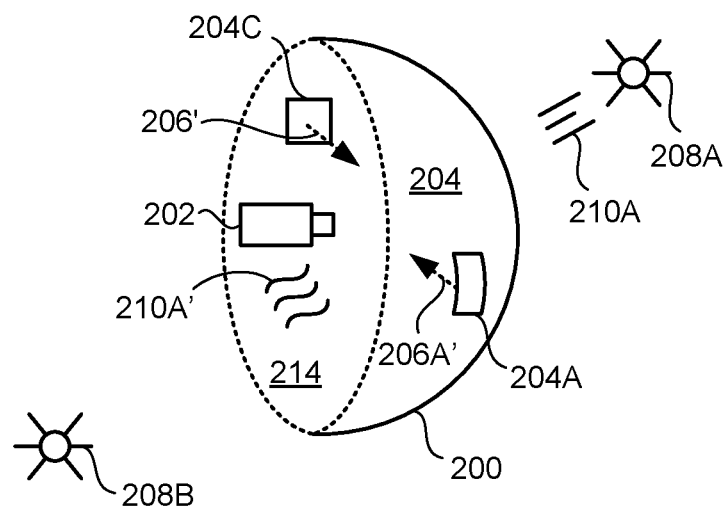

FIGS. 2A-B show an example of rendering an inside of an AR object 200. The AR object 200 can be, or be part of, any other AR object described herein, such as in FIG. 1A-B, 3, 4A-C or 5A-C. The AR object 200 is here a sphere that is rendered in an AR environment. A viewer 202 is defined in the AR environment. The viewer 202 is here visually represented as a camera for explanatory purposes and may not be visible to a user observing the AR environment—rather, the viewer 202 can be a digital tool used to define what aspect(s) of the AR environment should be visible to the user at any given moment. As such, the user may be able to move the viewer 202, for example by relocating a handheld device or by manipulating an input control.

The AR object 200 has an outside surface 204 that here has defined on it respective surface features 204A-C. For example, with reference again to FIG. 1B, each of the eyes, nose and mouth of the statue in the AR object 100 can be an example of the surface features 204A-C. As such, the user may be able to see one or more of the surface features 204A-C on the outside surface 204 depending on where the viewer 202 is currently positioned. For example, the surface features 204A-B are positioned on the near side of the sphere and are therefore drawn with solid lines, and the surface feature 204C is positioned on the far side of the sphere and is therefore drawn with a dashed line.

Each of the surface features 204A-C, and the remainder of the outside surface 204, can be defined using respective textures that determine the appearance(s) observable by the user. In short, the AR object 200 can be defined using a mesh, such as by an assembly of polygons or other faces that define the surface. A material can then be applied onto the mesh, and this material can contain a collection of properties about the AR object 200. One property of the material can be a texture that can define, say, a color, a pattern, a transparency, and/or one or more other visual aspects of the AR object 200. The mesh can have a direction defined for it, such as at any given point or other locality of the AR environment where the mesh is defined. The direction can vary based on the outside surface 204. For example, the surface features 204A-C here have respective normal vectors 206A-C. The normal vectors 206A-C are currently defined as pointing away from the inside of the AR object 200. The normal vectors 206A-B are drawn in solid lines corresponding to the positions of the respective surface features 204A-B, and the normal vector 206C is drawn in a dashed line corresponding to the position of the surface feature 204C.

An AR environment can have virtual light defined therein, so that light impinging on a surface makes that surface visible to a viewer or other camera function in the AR environment. A light source can deliver light having a defined direction, such as is the case with a spotlight. In some implementations, a state of having "no light" in the AR environment may be recognized, which can correspond to a medium state of light without any directional source. This can be considered a non-directional global light or global illumination that does not have a light source. As such, in such implementations, the available light may still have the ability to illuminate a surface in the AR environment.

In this example, the AR environment has light therein. In some implementations, this can involve light with a defined direction, and/or medium light without a directional source. For example, light sources 208A-B are here defined relative to the AR object 200. Each of the light sources 208A-B can generate light in the AR environment. The light from the light sources 208A-B is virtual light in the sense that it exists within the AR environment and can there illuminate virtual objects such as the AR object 200 or aspects thereof. Here, light rays 210A-B are generated by the respective light sources 208A-B and are schematically illustrated.

The light generated by the light sources 208A-B can affect how features of the AR object 200 are visible in the AR environment. For example, the AR object 200 may only have an outside appearance defined for it by way of the textures of the surface features 206A-C and the outside surface 204, and may not currently have any inside appearance because there are currently no textures defined for the inside of the AR object 200. In other words, the AR object 200 may only have an outside appearance defined for it by way of the textures of the surface features 206A-C and the outside surface 204, and may not have any pre-defined attributes defined by the author of the AR object 200 to produce an interior texture of any kind. That is, if the viewer 202 were to be positioned inside the AR object in the situation shown in FIG. 2A, the user may not see anything because no texture has been defined inside the AR object 200 and the outside surface 204 may be non-transparent. Rather, textures, transparency and/or other effects can be defined for the inside surface in a streamlined way that gives the user a cognitively meaningful experience when traveling between the outside and inside of the AR object 200.

Assume here that the viewer 202 is traveling as indicated by an arrow 212. That is, the viewer 202 is moving toward the outside surface 204 of the AR object 200. If the movement continues, the viewer 202 will at some point in time abut (or "contact") the outside surface 204. For example, contact can be defined as occurring when the point defined as the vantage point by the viewer 202 coincides with at least one point that is part of the outside surface 204. In some implementations, this occurrence can be described in terms of the viewer 202 clipping the outside surface 204 of the AR object 200. Accordingly, the system that generates the AR environment can determine whether and when the viewer 202 is inside the AR object 200 as a result of the movement of the viewer 202. In some implementations, the clipping can occur because the AR object 200 is moving and the viewer 202 is stationary. In some implementations, the clipping can occur because the AR object 200 and the viewer 202 are both moving. In some implementations, the clipping can occur because the AR object 200 is moving and the viewer 202 is stationary.

One or more operations can be performed in response to the determination that the viewer 202 is clipping (or has clipped) the outside surface 204 of the AR object 200, for example as will now be described. FIG. 2B schematically shows the AR object 200 when the viewer 202 is inside the AR object 200. The AR object 200 is here indicated by a half-sphere to allow illustration of the inside of the AR object 200. However, the AR object 200 can continue to be a sphere substantially as described above with reference to FIG. 2A also during and after the clipping. The diameter circumference of the AR object 200 is here illustrated by way of a dashed line to emphasize that a portion of the sphere has been omitted for clarity.

The AR object 200 here has an inside surface 214. The inside surface 214 and the outside surface 204 can be based on a common definition. Moreover, in response to determining that the viewer 202 clips the outside surface 204, the transparency of the outside surface 204 can be increased. The increased transparency can allow at least some light from the light source 208A and/or 208B to enter the inside of the AR object 200. For example, light rays 210A' are here shown as having entered the inside of the AR object 200 from the outside.

Another example of an operation that can be performed in response to the determination that the viewer 202 is clipping (or has clipped) the outside surface 204 of the AR object 200 is that the direction of one or more meshes can be reversed or otherwise altered. For example, the normal vector of the mesh of the surface feature 204A can be inverted to form an inverted normal vector 206A' that instead points toward the inside of the AR object 200. As another example, the normal vector of the mesh of the surface feature 204C can be inverted to form an inverted normal vector 206C' that instead points toward the inside of the AR object 200. Because the inverted normal vectors 206A' and 206C' are visible by the viewer 202 in its current position inside the AR object 200, this means that at least the surface features 204A and 204C are in principle possible to view from the inside of the AR object 200. Moreover, because the light rays 210' have entered the inside of the AR object due to its increased transparency, there is now illumination inside the AR object 200 that allows the viewer 202 to see the surface features 204A and 204C. As such, in the situation shown in FIG. 2B, the user can currently see at least the surface features 204A and 204C on the inside surface 214 and can therefore experience a cognitively plausible impression of being inside the AR object 200. One or more effects, filters and/or other modifications can be applied to the AR object 200 as seen while the viewer 202 is on the inside. In some implementations, a glass shader or a water shader can be applied. For example, the applied shader can provide the user with the visual impression described above with regard to FIG. 1B.

As such, the above implementations can exemplify performance of a method that involves triggering rendering of an AR environment, such as the AR environment shown in FIGS. 1A-B. The AR environment can have the light source 208A and/or 208B and the viewer 202. The viewer 202 can be placed at various locations in the AR environment and can be defined for generating views of the AR environment from those locations. The AR object 100 and/or 200 can be generated in the AR environment and can have the outside surface 104 and/or 204 that is visualized using one or more textures applied to one or more meshes. The mesh(es) can have directions defined, such as by way of the normal vectors 206A-C which can be oriented away from the AR object 100/200. A determination can be performed that the viewer 202 is inside the AR object 100/200 as a result of movement in the AR environment. In response to such a determination, a transparency of the outside surface 104/204 can be increased. In response to such a determination, the direction of the mesh(es) can be reversed, such as by generating the inverted normal vectors 206A' and/or 206C'. In response to such a determination, the inside surface 214 of the AR object 100/200 can be rendered using at least the part of the texture whose mesh has the reversed direction. For example, the surface features 204A and/or 204C can be rendered. The inside surface 214 can be illuminated by the light rays 210A' due to the increased transparency. One advantage of such an approach can be that no changes need to be made in the model of the AR object 100/200 itself, but rather the inside surface can be defined when needed (e.g., when it is determined that clipping occurs).

The viewer 202 may remain inside the AR object 200 indefinitely, or it may again transition to the outside, such as by again clipping the outside surface as a result of relative movement between the viewer 202 and the AR object 200. Accordingly, the system that generates the AR environment can make a determination that the viewer 202 is now outside the AR object 200. In response to such a determination the transparency of the outside surface 204 can be restored. For example, the AR object 200 can be made non-transparent again. In response to such a determination, the direction of the mesh(es) can be reverted to instead be directed away from the AR object 200. For example, the normal vectors 206A-C can be restored.

Figure 3:
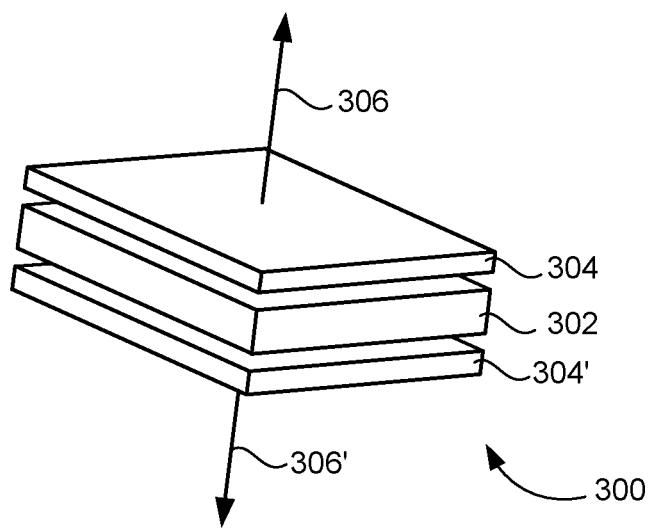
FIG. 3 shows an example of reversing a direction of a mesh for an AR object.

FIG. 3 shows an example of reversing a direction of a mesh for an AR object. Here, an object surface 300 is defined for the AR object, in analogy with the outside surface 104 for the AR object 100 and/or with the outside surface 204 for the AR object 200. As such, the entire AR object is not currently show in the present figure, only the part corresponding to the object surface 300. The AR object can be, or be part of, any other AR object described herein, such as in FIG. 1A-B, 2A-B, 4A-C or 5A-C. Here, the object surface 300 has an essentially square configuration but can have other shapes in other implementations.

A mesh 302 is here defined for the object surface 300. For example, the mesh 302 defines the shape or other properties of the object surface 300 except for its visual appearance. Moreover, a material 304 is here applied to the mesh 302. The material 304 can have one or more properties, including a texture for the object surface 300. A direction can be defined for the mesh 302, such as by way of one or more normal vectors 306. For example, the material 304 defines the appearance of the object surface 300 when viewed from the outside of the AR object, such as the appearance of the AR object 100 in FIG. 1A.

Similar to examples described above, a determination can be made that a viewer in the AR environment has clipped the object surface 300 of the AR object. For example, this determination can indicate that the viewer is currently positioned inside the AR object. In response to such a determination, one or more operations can be performed. For example, the direction of the mesh 302 can be reversed, such as by defining an inverted normal vector 306'. The definition of the inverted normal vector 306' can effectively define a material 304' on an inside surface of the AR object. For example, the material 304' can allow the viewer inside the AR object to see, by way of the texture property, one or more features that were previously defined as being on the outside surface of the AR object.

As another example, a shader can be applied to the material 304/304' in response to determining that the viewer in the AR environment has clipped the object surface 300 of the AR object. In some implementations, a property of the material 304/304' can be altered. For example, the shader can involve applying or modifying one or more of: a glass shader, a water shader, a translucency, a reflectiveness, a refraction, and/or a diffraction.

Figure 4A:
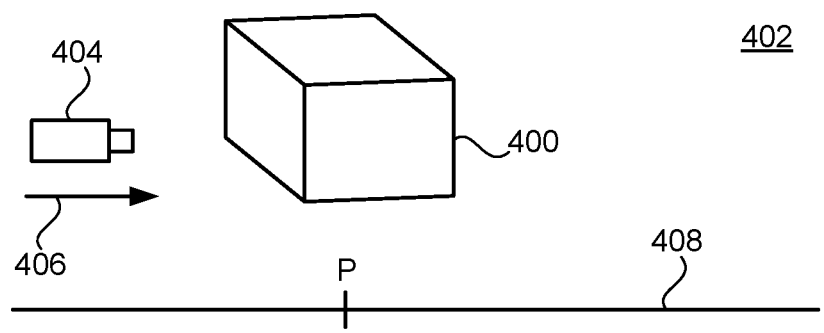
FIGS. 4A-C show an example of repositioning an AR object based on a viewer position.
Figure 4B:
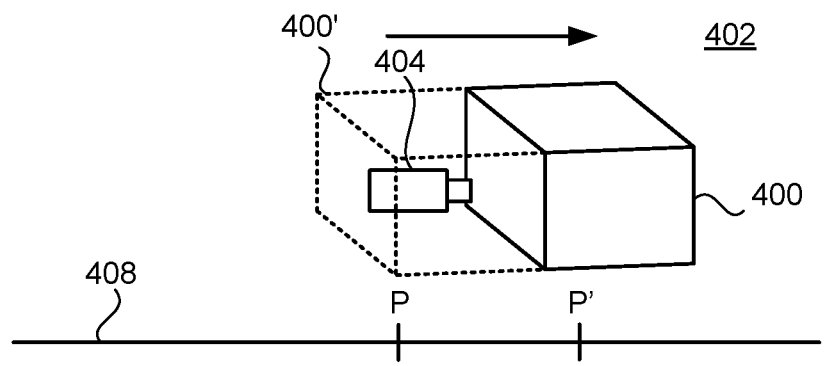
Figure 4C:
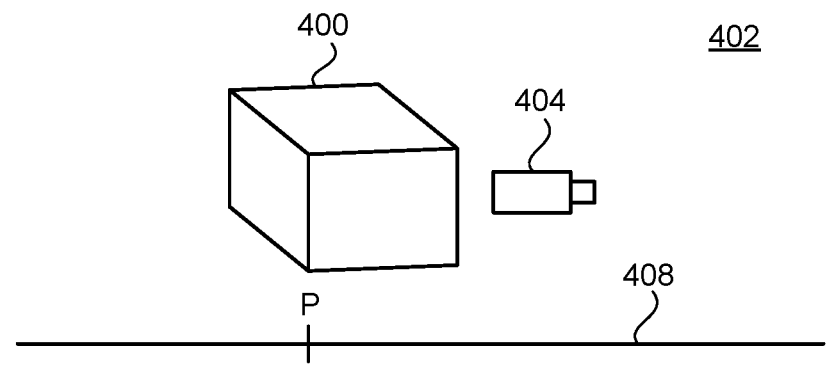

FIGS. 4A-C show an example of repositioning an AR object 400 based on a viewer position. The AR object 400 can be, or be part of, any other AR object described herein, such as in FIG. 1A-B, 2A-B, 3 or 5A-C. The AR object 400 is here defined in an AR environment 402. As with other AR environments, the AR environment 402 can include imagery of a physical reality (e.g., a camera view of the user's surroundings) and imagery of virtual reality (e.g., the AR object 400). The presentation of the AR environment can then provide the user a view that simultaneously shows at least some of the imagery of the physical reality and at least some of the imagery of virtual reality. A viewer 404, such as any of the viewers described elsewhere herein, is defined in the AR environment 402, and the viewer 404 can undergo movement, for example as indicated by an arrow 406. As such, the relative movement between the viewer 404 and the AR object 400 in the present example is based on the viewer 404 moving and the AR object 400 initially being stationary. Another example of relative movement will be described below with reference to FIGS. 12A-C.

In some implementations, a plausible interaction between the user (embodied by the viewer 404 defined in the AR environment 402) and the AR object 400 can be that the AR object 400 should in some sense behave like an object in physical reality when interacted with by the user, but that the interaction should not result in making any persistent changes in the appearance or location of the AR object 400.

The user can push the AR object 400 in one or more directions by abutting the viewer 404 against the outside surface of the AR object 400. Here, the AR environment 402 has defined therein an axis 408 which may or may not be visible to the user. In some implementations, the position of the AR object 400 can be defined using the axis 408. The axis 408 can quantify the movement of the AR object 400 with regard to an initial position P marked on the axis 408.

Assume now that the user pushes the AR object 400 using the viewer 404. For example, the user physically moves a handheld device which is capturing the physical environment that is part of the AR environment 402, or activates an input control on a device that controls the AR environment 402. FIG. 4B shows that the viewer 404 has pushed the AR object 400 to a new position P' on the axis 408. A dashed outline 400' indicates where in the AR environment 402 the AR object 400 was initially located and thus illustrates that the AR object 400 has been moved away from this position. During this interaction, the user may continue to see the outer surface of the AR object 400 through the viewer 404. This behavior can be consistent with the notion of pushing the AR object 400 in front of oneself while moving. For example, a linear translation of the AR object 400 from the position P to the position P' can be performed as part of the interaction.

One or more thresholds can be established in the AR environment 402. A threshold can define the maximum distance that the user can push the particular AR object 400 in a given direction. In some implementations, the threshold can be defined based on a length of the AR object 400 in a direction of the continued movement of the viewer 404. For example, the threshold can be reached when the AR object 400 has traveled a certain proportion of its own size, such as 50% of its length.

Assume now that the position P' here corresponds to the threshold for the particular AR object 400 in the current direction. In response to the threshold being reached, the AR object 400 can be relocated to the initial position P. FIG. 4C shows the AR environment 402 after the AR object 400 is relocated to the position P along the axis 408 in response to the threshold being reached. For example, the AR object 400 can be translated in the opposite direction along the axis 408. That is, the AR object 400 is now back at the initial position that it had before the interaction, and the interaction has not produced any permanent or persistent changes in the AR environment 402. However, the viewer 404 is now on the opposite side of the AR object 400 than it was before and during the course of the interaction. That is, when the AR object 400 is relocated from the threshold position (e.g., the position P') to the initial position P, this can appear to the user as if the viewer 404 is traveling through (perhaps almost instantaneously) the AR object 400 and is emerging on the other side of the AR object 400. This can be a plausible behavior to the user and can give a cognitively connected experience of having been transported through the AR object 400.

As such, the above implementation shown in FIGS. 4A-C can exemplify performance of a method that involves rendering the AR environment 402. The AR environment 402 has the viewer 404 configured for movement to locations in the AR environment 402 and for generating views of the AR environment 402 from the locations. The AR object 400 can also be rendered in the AR environment 402. A first determination that the viewer 404 contacts the AR object 400 as a result of the movement can be performed. In response to such a first determination, the AR object 400 can be repositioned in the AR environment 402 to track continued movement of the viewer 404. For example, the AR object 400 can track the movement of the viewer 404 and thereby be repositioned from the position P to the position P'. A second determination that the repositioning of the AR object 400—based on the continued movement of the viewer 404—reaches a threshold such as the position P' can be performed. In response to such a second determination, the AR object 400 can be relocated to the position P without affecting the continued movement of the viewer 404. For example, as part of the relocation the viewer 404 passes through the AR object 400 and emerges on the opposite side thereof.

One or more effects can be applied to the AR object 400 as part of the interaction. In some implementations, the effect is applied during the time that the AR object 400 is displaced from its initial position. Any type of effect can be applied, including but not limited to those mentioned elsewhere herein, such as a partial transparency. For example, this can allow the user to partially see through the AR object 400 while pushing the AR object 400 in front of the user.

Figure 12A:
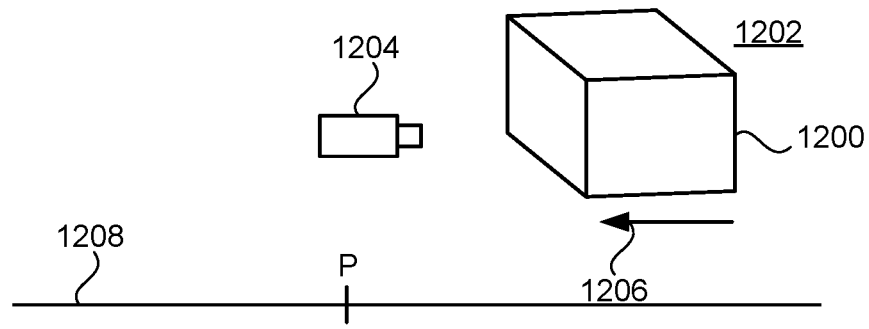
FIGS. 12A-C show another example of repositioning an AR object based on a viewer position.
Figure 12B:
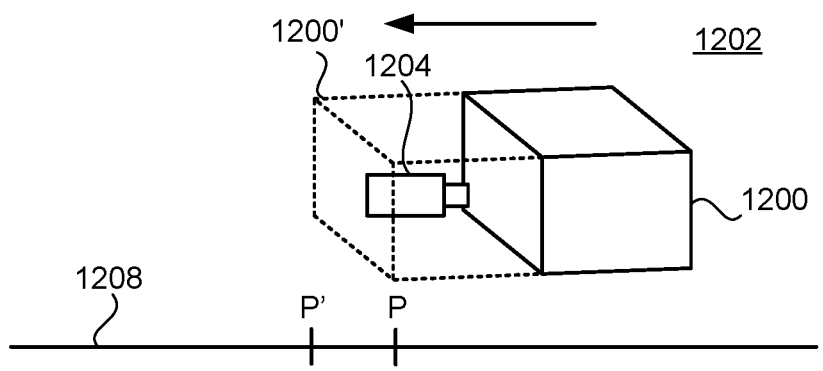
Figure 12C:
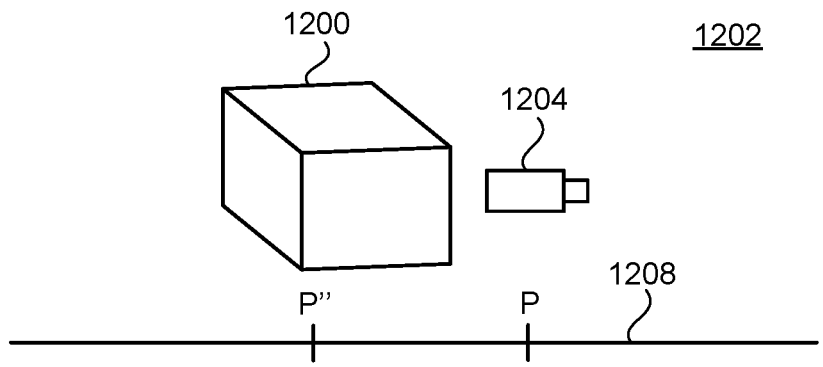

FIGS. 12A-C show another example of repositioning an AR object 1200 based on a viewer position. The AR object 1200 can be, or be part of, any other AR object described herein, such as in FIG. 1A-B, 2A-B, 3, 4A-C or 5A-C. The AR object 1200 is here defined in an AR environment 1202. As with other AR environments, the AR environment 1202 can include imagery of a physical reality (e.g., a camera view of the user's surroundings) and imagery of virtual reality (e.g., the AR object 1200). The presentation of the AR environment can then provide the user a view that simultaneously shows at least some of the imagery of the physical reality and at least some of the imagery of virtual reality. A viewer 1204, such as any of the viewers described elsewhere herein, is defined in the AR environment 1202. The AR object 1200 can undergo movement toward the viewer 1204, for example as indicated by an arrow 1206. As such, the relative movement between the viewer 1204 and the AR object 1200 in the present example is based on the AR object 1200 initially moving and the viewer 1204 being stationary.

In some implementations, a plausible interaction between the user (embodied by the viewer 1204 defined in the AR environment 1202) and the AR object 1200 can be that the AR object 1200 should in some sense behave like an object in physical realty when interacted with by the user, but that the interaction should not result in making any persistent changes in the appearance or location of the AR object 1200.

The AR object 1200 can push against the viewer 1204 in one or more directions by the outside surface of the AR object 1200 abutting against the viewer 1204. Here, the AR environment 1202 has defined therein an axis 1208 which may or may not be visible to the user. In some implementations, the position of the viewer 1204 and the AR object 1200 can be defined using the axis 1208. The axis 1208 can quantify the movement of the AR object 1200 with regard to an initial position P of the viewer 1204 marked on the axis 1208.

Assume now that the AR object 1200 pushes against the viewer 1204. For example, this can occur because the AR object 1200 is defined to travel along a path (e.g., a straight path) in the AR environment 1202. FIG. 12B shows that the abutting of the AR object 1200 against the viewer 1204 has temporarily halted the movement of the AR object 1200. A dashed outline 1200' indicates where in the AR environment 1202 the AR object 1200 would have been located if it had not abutted the viewer 1204. During this interaction, the user may continue to see the outer surface of the AR object 1200 through the viewer 1204. This behavior can be consistent with the notion of the AR object 1200 remaining in front of the viewer 1204 for a brief period of time.

One or more thresholds can be established in the AR environment 1202. A threshold can define the maximum distance that the movement of the AR object 1200 can be temporarily halted in a given direction as a result of abutting the viewer 1204. Here, when the dashed outline 1200' reaches a position P' on the axis 1208, the temporary halting of the movement of the AR object 1200 can cease. In some implementations, the threshold can be defined based on a length of the AR object 1200 in a direction toward the viewer 1204. For example, the threshold can be reached when the dashed outline 1200' has traveled a certain proportion of the size of the AR object 1200, such as 50% of its length.

Assume now that the position P' here corresponds to the threshold for the dashed outline 1200' of the particular AR object 1200 in the current direction. In response to the threshold P' being reached by the dashed outline 1200', the AR object 1200 can be relocated to a position P''' on the other side of the viewer 1204, as indicated in FIG. 12C. Here, the AR environment 1202 is shown after the AR object 1200 is relocated to the position P''' along the axis 1208 in response to the threshold P' being reached by the dashed outline 1200'. For example, the AR object 1200 can be translated along the axis 1208. That is, the AR object 1200 is now on the opposite side of the viewer 1204 compared to before the interaction, and the interaction has not produced any permanent or persistent changes in the AR environment 1202. That is, when the AR object 1200 is relocated from the threshold position to the position P''', this can appear to the user as if the AR object 1200 is traveling past (perhaps almost instantaneously) the viewer 1204 and is emerging on the other side of the viewer 1204 (where it could be visible if the user turns the viewer 1204 in that direction). This can be a plausible behavior to the user and can give a cognitively connected experience of the AR object 1200 having been transported past the viewer 1204.

Figure 5A:
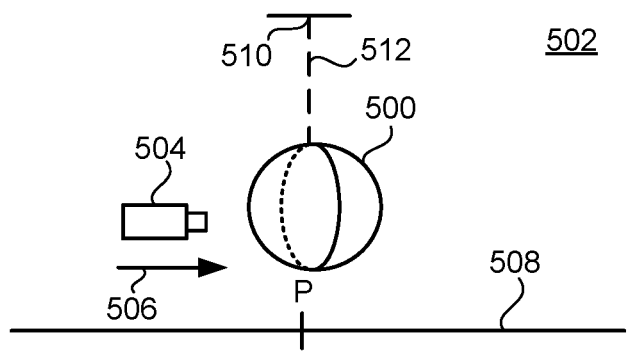
FIGS. 5A-C show an example of repositioning an AR object based on a viewer position.
Figure 5B:
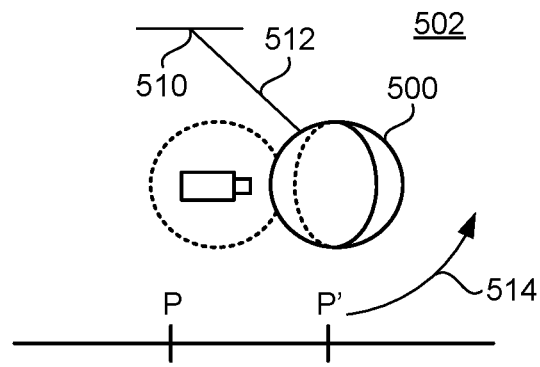
Figure 5C:
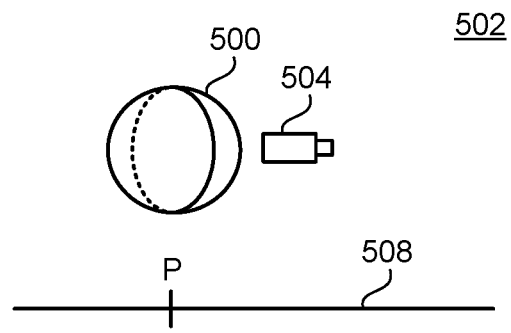

FIGS. 5A-C show an example of repositioning an AR object 500 based on a viewer position. The AR object 500 can be, or be part of, any other AR object described herein, such as in FIG. 1A-B, 2A-B, 3 or 4A-C. The AR object 500 is here defined in an AR environment 502. As with other AR environments, the AR environment 502 can include imagery of a physical reality (e.g., a camera view of the user's surroundings) and imagery of virtual reality (e.g., the AR object 500). A viewer 504, such as any of the viewers described elsewhere herein, is defined in the AR environment 502, and the viewer 504 can undergo movement, for example as indicated by an arrow 506. As such, the relative movement between the viewer 504 and the AR object 500 in the present example is based on the viewer 504 moving and the AR object 500 initially being stationary. Another example of relative movement will be described below with reference to FIGS. 13A-C.

In some implementations, a plausible interaction between the user (embodied by the viewer 504 defined in the AR environment 502) and the AR object 500 can be that the AR object 500 should in some sense behave like an object in physical reality when interacted with by the user, but that the interaction should not result in making any persistent changes in the appearance or location of the AR object 500.

The user can push the AR object 500 in one or more directions by abutting the viewer 504 against the outside surface of the AR object 500. Here, the AR environment 502 has defined therein an axis 508 in analogy with the axis 408 described above. Assume now that the user pushes the AR object 500 using the viewer 504. For example, the user physically moves a handheld device which is capturing the physical environment that is part of the AR environment 502, or activates an input control on a device that controls the AR environment 502.

A fulcrum 510 is defined in the AR environment 502 in response to the interaction between the viewer 504 and the AR object 500. A pivot arm 512 is also defined in the AR environment 502 in response to the interaction between the viewer 504 and the AR object 500. The fulcrum 510 and/or the pivot arm 512 may not be visible to the user. Here, the pivot arm 512 connects the AR object 500 and the fulcrum 510 to each other so that the AR object 500 is at least partially rotatable about the fulcrum 510. In some implementations, the fulcrum 510 and the pivot arm 512 are not defined as part of the model that defines the AR object 500 but rather are separate from the model of the AR object 500 and from the model of any other AR object that can be presented in the AR environment 502.

FIG. 5B shows that the viewer 504 has here pushed the AR object 500 as indicated by an arc 514 to a new position P' on the axis 508. A dashed outline 500' indicates where in the AR environment 502 the AR object 500 was initially located and thus illustrates that the AR object 500 has been moved away from this position. During this interaction, the user may continue to see the outer surface of the AR object 500 through the viewer 504. This behavior can be consistent with the notion of the AR object 500 being suspended from the fulcrum 510, with the user pushing the AR object 500 away (in this example, somewhat upward) by the movement in the AR environment 502. For example, a rotation of the AR object 500 from the position P to the position P' about the fulcrum 510 can be performed as part of the interaction.

One or more thresholds can be established in the AR environment 502 in analogy with the description above. For example, the threshold can be reached when the AR object 500 has traveled a certain proportion of its own size, such as 50% of its length.

Assume now that the position P' here corresponds to the threshold for the particular AR object 500 in the current direction. In response to the threshold being reached, the AR object 500 can be relocated to the initial position P. FIG. 5C shows the AR environment 502 after the AR object 500 is relocated to the position P along the axis 508 in response to the threshold being reached. For example, the AR object 500 can be rotated in the opposite direction about the fulcrum 510. That is, the AR object 500 is now back at the initial position that it had before the interaction, and the interaction has not produced any permanent or persistent changes in the AR environment 502. However, the viewer 504 is now on the opposite side of the AR object 500 than it was before and during the course of the interaction. That is, when the AR object 500 is relocated from the threshold position (e.g., the position P') to the initial position P, this can appear to the user as if the viewer 504 is traveling through (perhaps almost instantaneously) the AR object 500 and is emerging on the other side of the AR object 500. This can be a plausible behavior to the user and can give a cognitively connected experience of having been transported through the AR object 500.

As such, the above implementation shown in FIGS. 5A-C can exemplify performance of a method that involves rendering the AR environment 502. The AR environment 502 has the viewer 504 configured for movement to locations in the AR environment 502 and for generating views of the AR environment 502 from the locations. The AR object 500 can also be rendered in the AR environment 502. A first determination that the viewer 504 contacts the AR object 500 as a result of the movement can be performed. In response to such a first determination, the AR object 500 can be repositioned in the AR environment 502 to track continued movement of the viewer 504. For example, the AR object 500 can track the movement of the viewer 504 and thereby be repositioned from the position P to the position P'. A second determination that the repositioning of the AR object 500—based on the continued movement of the viewer 504—reaches a threshold such as the position P' can be performed. In response to such a second determination, the AR object 500 can be relocated to the position P without affecting the continued movement of the viewer 504. For example, as part of the relocation the viewer 504 passes through the AR object 500 and emerges on the opposite side thereof.

One or more effects can be applied to the AR object 500 as part of the interaction. In some implementations, the effect is applied during the time that the AR object 500 is displaced from its initial position. Any type of effect can be applied, including but not limited to those mentioned elsewhere herein, such as a partial transparency. For example, this can allow the user to partially see through the AR object 500 while pushing the suspended AR object 500 in front of the user.

In the above example, the fulcrum 510 was defined essentially above the AR object 500 so that the AR object 500 in a sense can be considered to be suspended from the fulcrum 510 during the interaction with the viewer 504. For example, the interaction with the AR object 500 can then be analogous with the behavior of an object such as a punching bag that is suspended from the ceiling. In some implementations, the fulcrum 510 (or another fulcrum) can be defined essentially below the AR object 500 so that the AR object 500 in a sense can be considered to be tethered to the ground by the pivot arm 512 during the interaction with the viewer 504. For example, the interaction with the AR object 500 can then be analogous with the behavior of a helium balloon tied to a string.

Figure 13A:
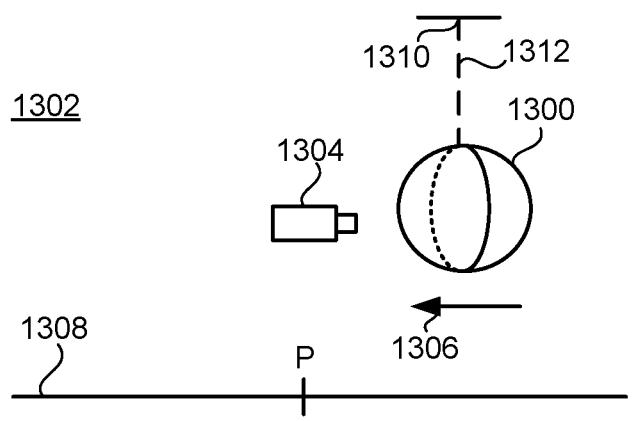
FIGS. 13A-C show another example of repositioning an AR object based on a viewer position.
Figure 13B:
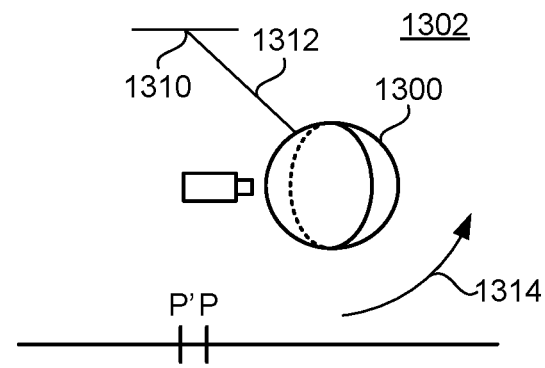
Figure 13C:
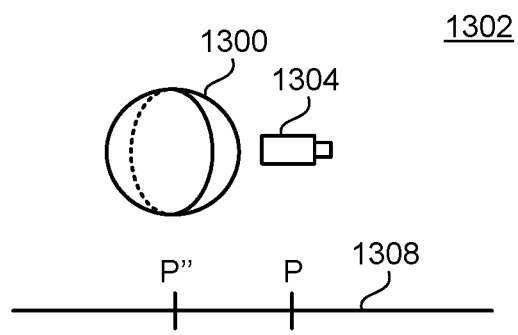

FIGS. 13A-C show another example of repositioning an AR object 1300 based on a viewer position. The AR object 1300 can be, or be part of, any other AR object described herein, such as in FIG. 1A-B, 2A-B, 3, 4A-C or 5A-C. The AR object 1300 is here defined in an AR environment 1302. As with other AR environments, the AR environment 1302 can include imagery of a physical reality (e.g., a camera view of the user's surroundings) and imagery of virtual reality (e.g., the AR object 1300). A viewer 1304, such as any of the viewers described elsewhere herein, is defined in the AR environment 1302. The AR object 1300 can undergo movement, for example as indicated by an arrow 1306. As such, the relative movement between the viewer 1304 and the AR object 1300 in the present example is based on the AR object 1300 moving and the viewer 1304 being stationary.

In some implementations, a plausible interaction between the user (embodied by the viewer 1304 defined in the AR environment 1302) and the AR object 1300 can be that the AR object 1300 should in some sense behave like an object in physical reality when interacted with by the user, but that the interaction should not result in making any persistent changes in the appearance or location of the AR object 1300.

The AR object 1300 can push against the viewer 1304 in one or more directions by the outside surface of the AR object 1300 abutting against the viewer 1304. Here, the AR environment 1302 has defined therein an axis 1308 in analogy with the axis 508 described above.

A fulcrum 1310 is defined in the AR environment 1302 in response to the interaction between the AR object 1300 and the viewer 1304. A pivot arm 1312 is also defined in the AR environment 1302 in response to the interaction between the AR object 1300 and the viewer 1304. The fulcrum 1310 and/or the pivot arm 1312 may not be visible to the user. Here, the pivot arm 1312 connects the AR object 1300 and the fulcrum 1310 to each other so that the AR object 1300 is at least partially rotatable about the fulcrum 1310. In some implementations, the fulcrum 1310 and the pivot arm 1312 are not defined as part of the model that defines the AR object 1300 but rather are separate from the model of the AR object 1300 and from the model of any other AR object that can be presented in the AR environment 1302.

Assume now that the AR object 1300 pushes against the viewer 1304 which is positioned at the position P on the axis 1308. For example, this can occur because the AR object 1300 is defined to travel along a path (e.g., a straight path) in the AR environment 1302. FIG. 13B shows that the abutting of the AR object 1300 against the viewer 1304 has here pushed the AR object 1300 as indicated by an arc 1314. During this interaction, the user may continue to see the outer surface of the AR object 1300 through the viewer 1304. This behavior can be consistent with the notion of the AR object 1300 being suspended from the fulcrum 1310 during its travel, with the AR object 1300 being pushed away (in this example, somewhat upward) by the fact that it abuts against the viewer 1304 on the course of its movement in the AR environment 1302. For example, a rotation of the AR object 1300 about the fulcrum 1310 can be performed as part of the interaction.

One or more thresholds can be established in the AR environment 1302 in analogy with the description above. A threshold can define the maximum distance that the fulcrum 1310 can travel while the AR object 1300 is abutting against the viewer 1304. Here, when the fulcrum 1310 reaches a position P' on the axis 1308, the abutting of the AR object 1300 against the viewer 1304 can cease.

Assume now that the position P' here corresponds to the threshold for the fulcrum 1310 of the particular AR object 1300 in the current direction. In response to the threshold P' being reached by the fulcrum 1310, the AR object 1300 can be relocated to a position P" on the other side of the viewer 1304, as indicated in FIG. 13C. Here, the AR environment 1302 is shown after the AR object 1300 is relocated to the position P" along the axis 1308 in response to the threshold being reached by the fulcrum 1310. For example, the AR object 1300 can be rotated in the opposite direction about the fulcrum 1310. That is, the AR object 1300 is now on the opposite side of the viewer 1304 compared to before the interaction, and the interaction has not produced any permanent or persistent changes in the AR environment 1302. That is, when the AR object 1300 is relocated from the threshold position to the position P", this can appear to the user as if the AR object 1300 is traveling past (perhaps almost instantaneously) the viewer 1304 and is emerging on the other side of the viewer 1304 (where it could be visible if the user turns the viewer 1304 in that direction). This can be a plausible behavior to the user and can give a cognitively connected experience of having been transported past the AR object 1300.

One or more aspects of the above examples can be defined as a generalized behavior in the system that generates an AR environment. This can reduce or eliminate the need to modify the models corresponding to AR objects, or to define object interactions separately for each AR object. Rather, the AR environment can have predefined therein one or more modes of interaction that can then generically be applied to any and all AR objects that are rendered. For example, referring again briefly to FIGS. 1A-B, the AR object 100 can be created with only the texture for the outside surface 104, and not any inside texture. When it is determined that the viewer clips the outside surface 104, the system can dynamically and in real time perform the reversal of direction of the mesh of the texture for the outside surface 104 so as to obtain the texture for the inside surface. As another example, referring again briefly to FIG. 4A-C (or 5A-C), the behavior that the AR object 400 (or 500) is temporarily pushed away by the viewer 404 (or 504) up until a threshold, and thereafter returns to its original position, can be a generalized behavior that is defined in the AR environment as being potentially applicable to all AR objects or other properties therein. For example, the fulcrum 510 and the pivot arm 512 may not constantly be present in the FIGS. 6-10 show examples of methods. Any of the methods can be performed in one or more computer systems, such as by at least one processor executing instructions stored in a non-transitory medium. For example, the method(s) can be performed in the device(s) shown in FIG. 11. More or fewer operations than shown can be performed with any or all off the methods. Also, two or more operations can be performed in a different order.

Figure 6:
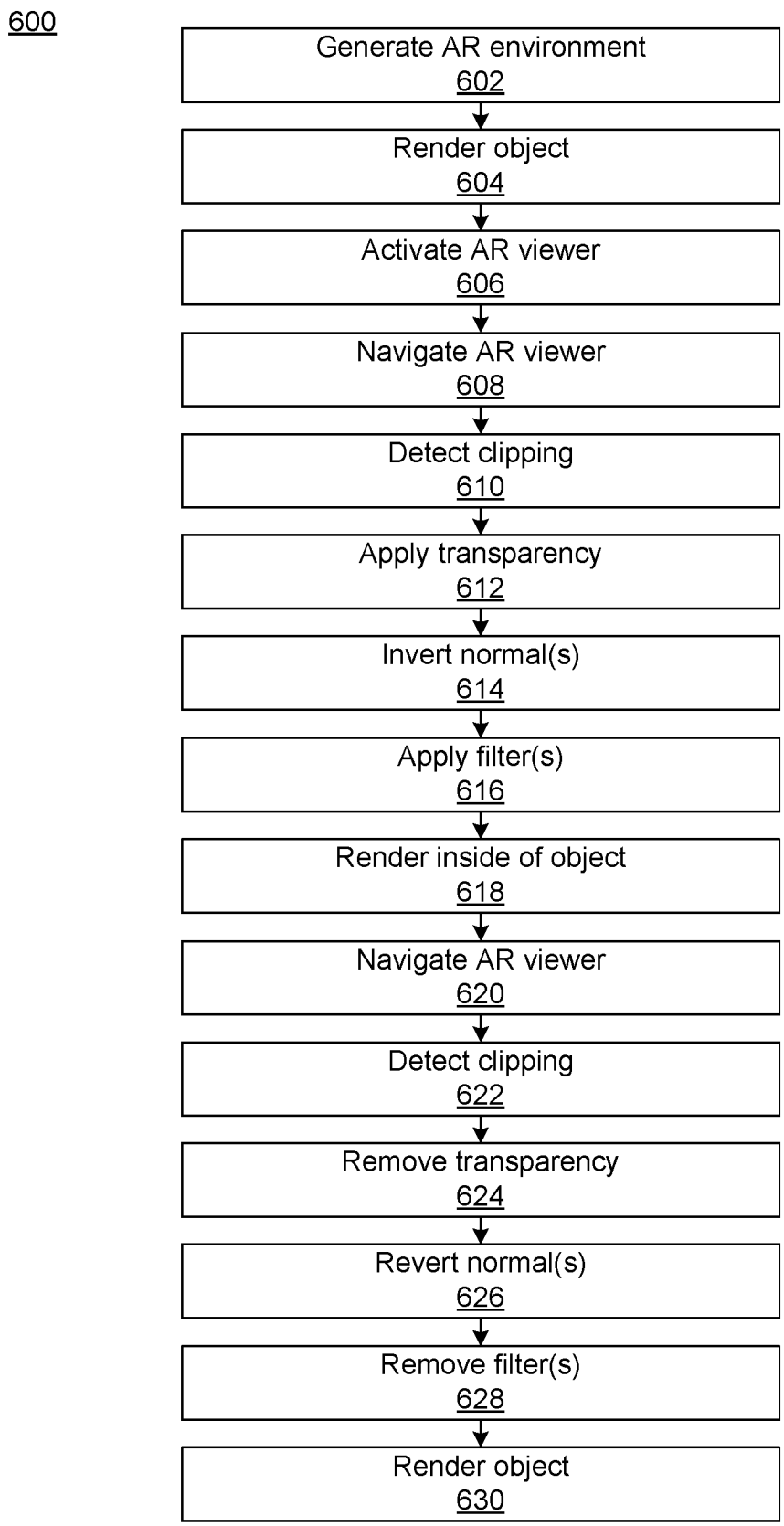
FIGS. 6-10 show examples of methods.

FIG. 6 shows an example of a method 600 that involves interaction between an AR viewer and an object in an AR environment. The AR object and/or the AR environment can be any of those described elsewhere herein, such as in FIG. 1A-B, 2A-B, 3, 4A-C or 5A-C. At 602, an AR environment can be generated. At 604, rendering of the AR object can be triggered. At 606, the AR viewer can be activated. For example, this allows the user to see the AR environment. At 608, the AR viewer can be navigated within the AR environment. For example, the user controls where the AR viewer should be moved. At 610, the system can detect that the AR viewer clips an outside surface of the AR object. At 612, one or more effects, including but not limited to transparency, can be applied to the AR object. At 614, the direction of one or more meshes can be reversed, such as by inverting a normal vector of the mesh. At 616, a filter or other effect can be applied to the AR object, including, but not limited to, a glass effect or a water effect. At 618, rendering of at least part of the inside of the AR object can be triggered. For example, the increased transparency of the outside surface may provide virtual light that illuminates the inside surface of the AR object and thereby makes it observable to the user. At 620, the user can (continue to) navigate the viewer. For example, once inside the AR object the user can continue to move in the same direction, or the user can turn the viewer and move in a different direction. At 622, the system can detect that the viewer clips the outside surface of the AR object and is thereafter positioned outside the AR object. In response to the detection of the clipping, the transparency can be removed (at 624), the normal vector(s) can be reverted (at 626), and/or the filter(s) can be removed (at 628). At 630, rendering of the AR object or another aspect of the AR environment can be triggered.

Figure 7:
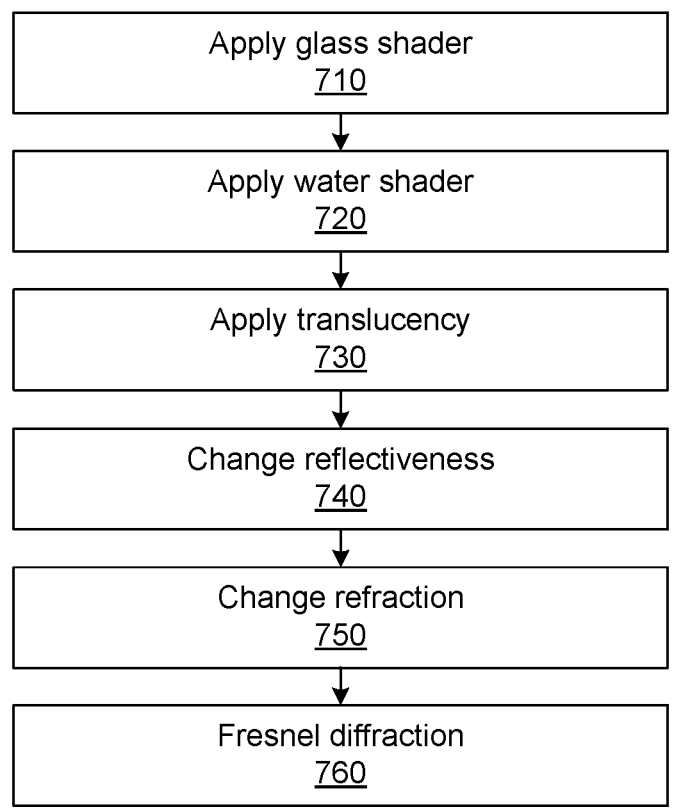

FIG. 7 shows examples of effects, filters and other features that can be applied to an AR object in a method 700. One or more operations of the method 700 can be applied during performance of another method described herein, including, but not limited to, as part of operation 612 and/or 618 in FIG. 6. Some examples of components from other implementations described herein will be mentioned solely for purposes of explanation. For example, one or more of the operations in the method 700 can be applied to the mesh 302 (FIG. 3) of an AR object.

At 710, a glass shader can be applied. For example, the glass effect can make the AR object 100 (FIG. 1B) appear as if it were made of glass.

At 720, a water effect can be applied. For example, the water effect can make the AR object 100 (FIG. 1B) appear as if it were made of water.

At 730, a translucency can be applied. For example, the translucency can make the AR object 100 (FIG. 1B) translucent.

At 740, a reflectiveness can be altered. For example, the change can make the AR object 100 (FIG. 1B) more reflective or less reflective.

At 750, a refraction can be altered. For example, the change can make the AR object 100 (FIG. 1B) more refractive or less refractive.

At 760, a Fresnel diffraction can be applied. In some implementations, a Fresnel shader is applied. For example, the Fresnel diffraction can generate one or more diffraction patterns on the AR object 100 (FIG. 1B).

Figure 8:
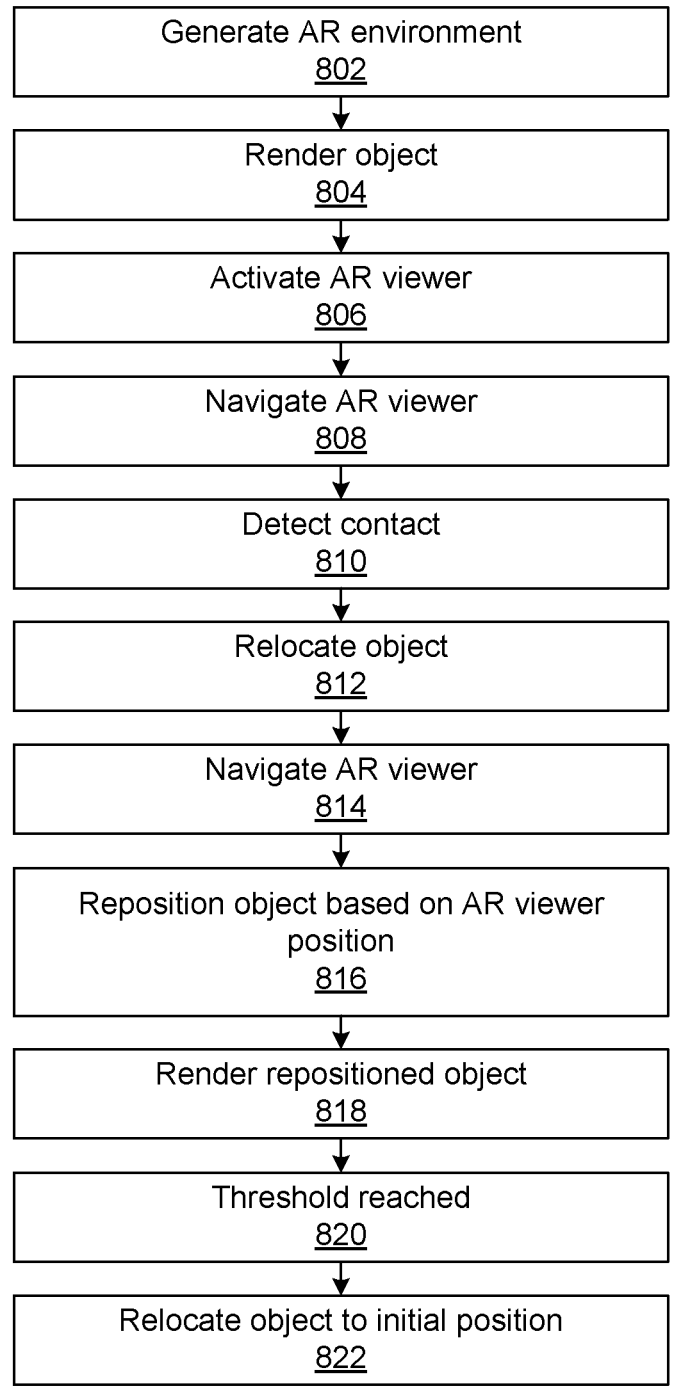

FIG. 8 shows a method 800 that is an example of temporarily displacing an AR object as part of an interaction with a viewer in an AR environment. The AR object and/or the AR environment can be any of those described elsewhere herein, such as in FIG. 1A-B, 2A-B, 3, 4AC or 5A-C. At 802, an AR environment can be generated.

At 804, rendering of an AR object can be triggered. At 806, an AR viewer can be activated. At 808, the AR viewer can be navigated by a user. At 810, contact between the AR viewer and the AR object can be detected. In response to the detection, the AR object can be relocated in the AR environment at 812. At 814, the user can (continue to) navigate the AR viewer in the AR environment. At 816, the AR object can be repositioned based on the position of the AR viewer. At 818, rendering of the repositioned object can be triggered. For example, the AR object can be continuously rendered during the repositioning performed at 816. At 820, it can be determined that the repositioning of the AR object has at least reached a threshold. At 822, and in response to the determination at 820, the AR object can be repositioned to its initial position.

Figure 9:
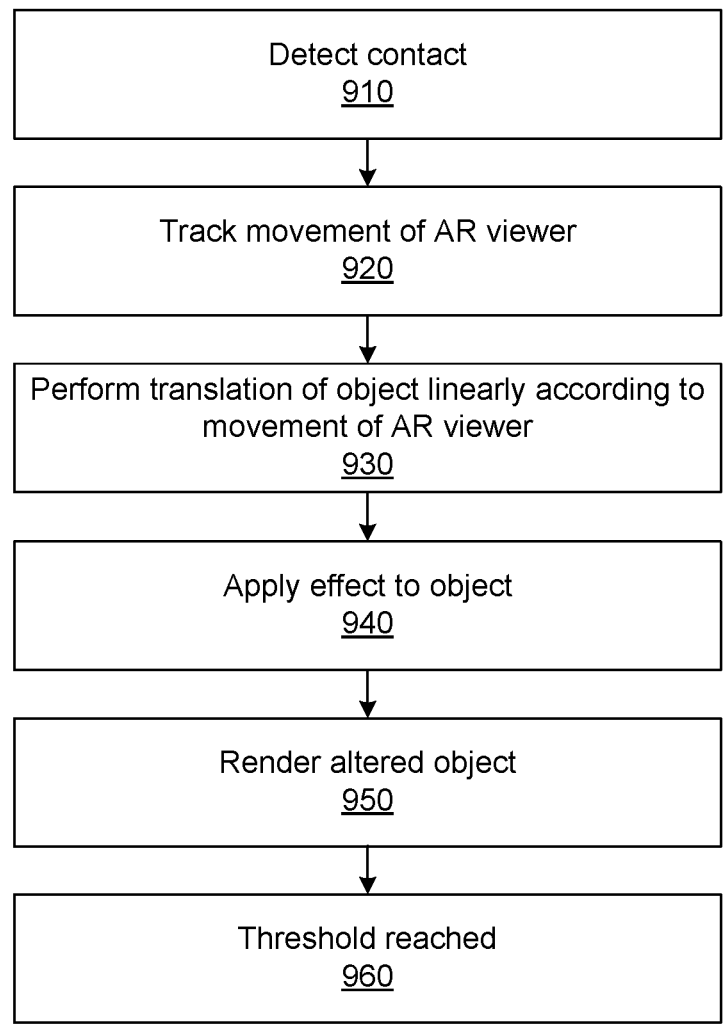

FIG. 9 shows an example of a method 900 of linearly translating an AR object. The AR object can be any of those described elsewhere herein, such as in FIG. 1A-B, 2A-B, 3, 4AC or 5A-C. One or more operations of the method 900 can be applied during performance of another method described herein, including, but not limited to, as part of operations 810-20 in FIG. 8. At 910, it can be determined that an AR viewer contacts the AR object in an AR environment. At 920, the (continued) movement of the AR viewer can be tracked. At 930, a translation of the AR object can be performed. The translation can be linear and can correspond to the movement of the AR viewer. At 940, an effect can be applied to the AR object, including, but not limited to, a partial transparency. At 950, rendering of the altered (e.g., partially transparent) AR object can be triggered so as to be visible to the user. At 960, it can be determined that a threshold in the AR environment has been reached.

Figure 10:
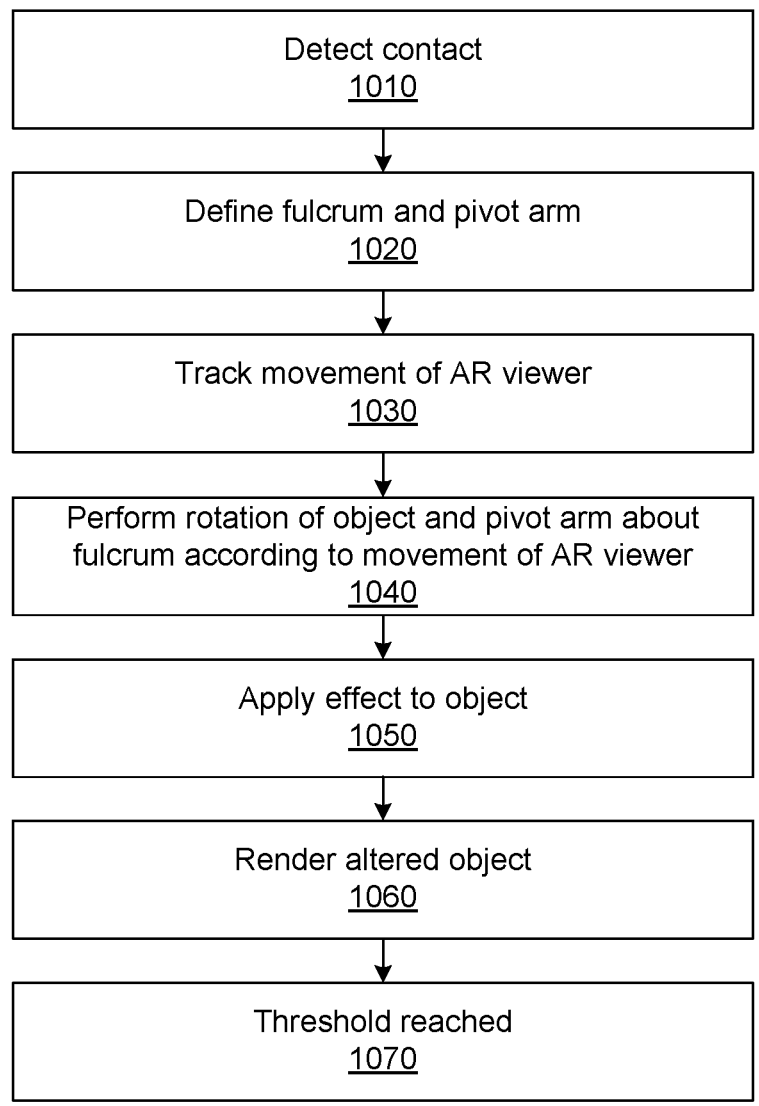

FIG. 10 shows an example of a method 1000 of linearly translating an AR object. The AR object can be any of those described elsewhere herein, such as in FIG. 1A-B, 2A-B, 3, 4AC or 5A-C. One or more operations of the method 1000 can be applied during performance of another method described herein, including, but not limited to, as part of operations 810-20 in FIG. 8. At 1010, it can be determined that an AR viewer contacts the AR object in an AR environment. At 1020, a fulcrum and pivot arm for the AR object can be defined in response to the detection. At 1030, the (continued) movement of the AR viewer can be tracked. At 1040, a rotation of the AR object can be performed. The rotation can be of the AR object and the pivot arm about the fulcrum, and can correspond to the movement of the AR viewer. At 1050, an effect can be applied to the AR object, including, but not limited to, a partial transparency. At 1060, rendering of the altered (e.g., partially transparent) AR object can be triggered so as to be visible to the user. At 1070, it can be determined that a threshold in the AR environment has been reached.

Figure 11:
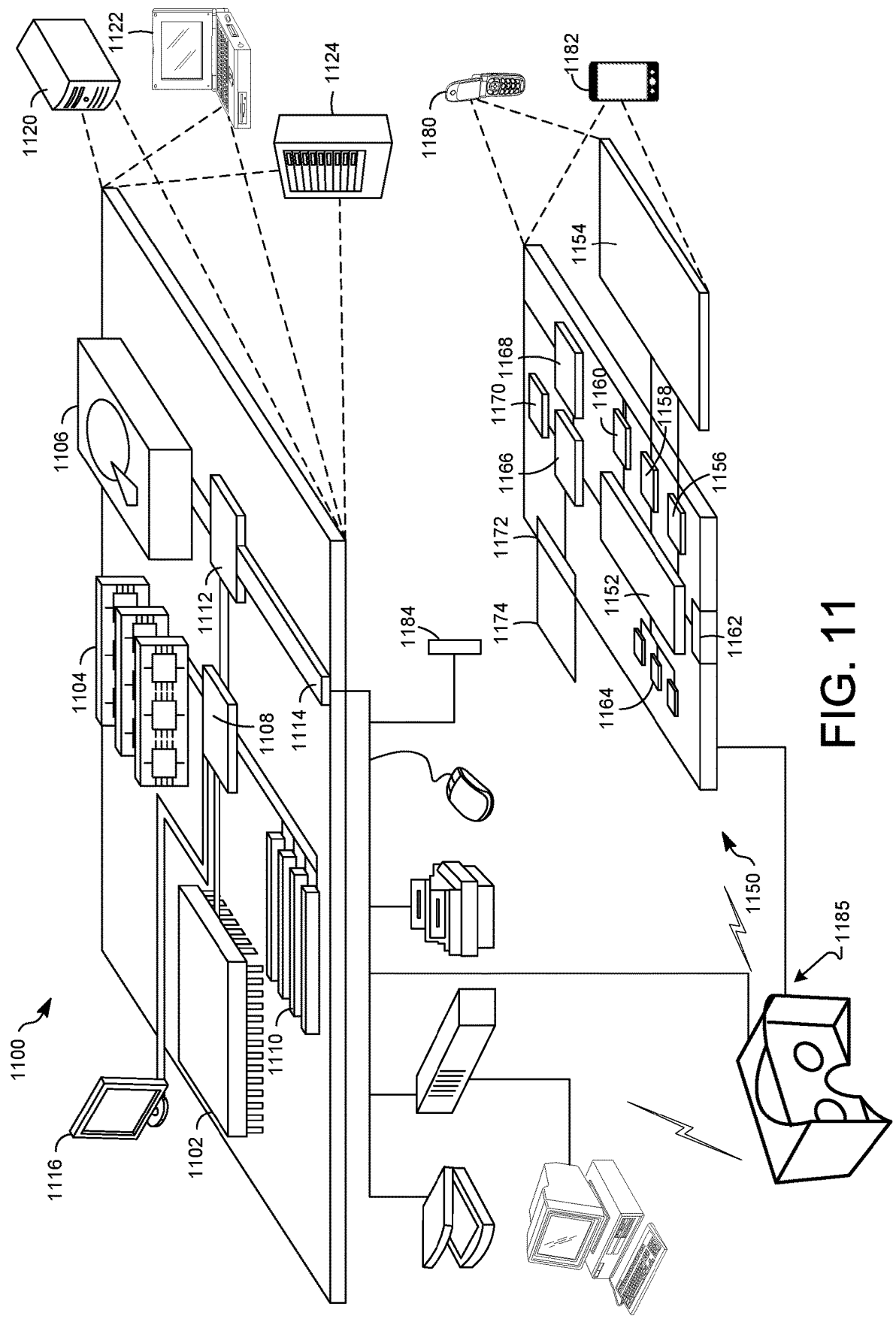
FIG. 11 shows an example of a computer device and a mobile computer device consistent with disclosed embodiments.

FIG. 11 shows an example of a computer device and a mobile computer device that can be used to implement the techniques described here. FIG. 11 shows an example of a generic computer device 1100 and a generic mobile computer device 1150, which may be used with the techniques described here. Computing device 1100 is intended to represent various forms of digital computers, such as laptops, desktops, tablets, workstations, personal digital assistants, televisions, servers, blade servers, mainframes, and other appropriate computing devices. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

A user can interact with a computing device using a tracked controller 1184. In some implementations, the controller 1184 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 1184 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 11 can include sensors that interface with a virtual reality (VR headset 1185). For example, one or more sensors included on a computing device 1150 or other computing device depicted in FIG. 11, can provide input to VR headset 1185 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1150 can use the sensors to determine an absolute position and/or a detected rotation of the computing device in the VR space that can then be used as input to the VR space. For example, the computing device 1150 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1150 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1150 when the computing device is incorporated into the VR space can cause a particular action to occur in the VR space.

In some implementations, a touchscreen of the computing device 1150 can be rendered as a touchpad in VR space. A user can interact with the touchscreen of the computing device 1150. The interactions are rendered, in VR headset 1185 for example, as movements on the rendered touchpad in the VR space. The rendered movements can control objects in the VR space.

In some implementations, one or more output devices included on the computing device 1150 can provide output and/or feedback to a user of the VR headset 1185 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1150 may appear as another object in a computer-generated, 3D environment. Interactions by the user with the computing device 1150 (e.g., rotating, shaking, touching a touchscreen, swiping a finger across a touch screen) can be interpreted as interactions with the object in the VR space. In the example of the laser pointer in a VR space, the computing device 1150 appears as a virtual laser pointer in the computer-generated, 3D environment. As the user manipulates the computing device 1150, the user in the VR space sees movement of the laser pointer. The user receives feedback from interactions with the computing device 1150 in the VR space on the computing device 1150 or on the VR headset 1185.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   rendering a virtual object at a first position in an augmented reality (AR) environment;
   in response to a movement of a viewpoint of an image of the AR environment toward and contacting the virtual object at the first position, pushing the virtual object away to a second position at a distance from the first position; and
   in response to the distance to the second position from the first position exceeding a threshold distance, repositioning the virtual object at a third position in the AR environment.

2. The method of claim 1, wherein the threshold distance is defined based on a length of the virtual object in a direction of the movement of the viewpoint toward the virtual object at the first position.

3. The method of claim 1, wherein the repositioning comprises performing a linear translation of the virtual object according to a continued movement of the viewpoint.

4. The method of claim 1, wherein the repositioning includes defining a fulcrum in the AR environment, defining a pivot arm from the virtual object to the fulcrum, and rotating the virtual object and the pivot arm about the fulcrum.

5. The method of claim 4, wherein the fulcrum is defined above the virtual object in the AR environment.

6. The method of claim 4, wherein the fulcrum is defined below the virtual object in the AR environment.

7. The method of claim 4, wherein the repositioning includes moving the fulcrum along an original direction of a movement of the pushed-away virtual object.

8. The method of claim 7, wherein repositioning results in the viewpoint being on an opposite side of the virtual object than the viewpoint was before the repositioning.

9. The method of claim 1, wherein repositioning the virtual object at the third position includes repositioning the virtual object at the first position in the AR environment.

10. The method of claim 1, wherein repositioning the virtual object includes applying an effect to the repositioned virtual object.

11. The method of claim 10, wherein applying the effect comprises altering a transparency of the virtual object.

12. A method comprising:
    rendering a virtual object at a first position in an augmented reality (AR) environment;
    in response to a movement of the virtual object toward and contacting a viewpoint of an image of the AR environment, temporarily halting the movement of the virtual object upon contacting the viewpoint;
    determining a projected distance of travel of the virtual object if the movement of the virtual object was not halted; and
    in response to the projected distance of travel of the virtual object exceeding a threshold distance, repositioning the virtual object to a second position in the AR environment.

13. The method of claim 12, wherein the threshold distance is defined based on a length of the virtual object in a direction of the movement of the virtual object toward the viewpoint.

14. The method of claim 12, wherein the repositioning comprises performing a linear translation of the virtual object according to a continued movement of the virtual object.

15. The method of claim 12, wherein the repositioning results in the viewpoint being on an opposite side of the virtual object than the viewpoint was before the repositioning.

16. A system comprising:
    a processor;
    a display coupled to the processor; and
    a non-transitory storage medium coupled to the processor and having stored thereon instructions that when executed by the processor are configured to cause the processor to perform operations including:
        rendering a virtual object at a first position in an augmented reality (AR) environment on the display;
        in response to a movement of a viewpoint of an image of the AR environment toward and contacting the virtual object at the first position, pushing the virtual object away to a second position at a distance from the first position; and
        in response to the distance to the second position from the first position exceeding a threshold distance, repositioning the virtual object at a third position in the AR environment.

17. The system of claim 16, wherein repositioning the virtual object at the third position results in the viewpoint being on an opposite side of the virtual object than the viewpoint was before the repositioning.

18. The system of claim 16, wherein repositioning the virtual object at the third position includes repositioning the virtual object at the first position in the AR environment.

19. A system comprising:
    a processor;
    a display coupled to the processor; and
    a non-transitory storage medium coupled to the processor and having stored thereon instructions that when executed by the processor are configured to cause the processor to perform operations including:
        rendering a virtual object at a first position in an augmented reality (AR) environment;
        in response to a movement of the virtual object toward and contacting a viewpoint of an image of the AR environment, temporarily halting the movement of the virtual object upon contacting the viewpoint;
        determining a projected distance of travel of the virtual object if the movement of the virtual object was not halted; and
        in response to the projected distance of travel of the virtual object exceeding a threshold distance, repositioning the virtual object to a second position in the AR environment.

20. The system of claim 19, wherein the repositioning results in the viewpoint being on an opposite side of the virtual object than the viewpoint was before the repositioning.

* * * * *